US008982894B2

(12) United States Patent
Horio

(10) Patent No.: US 8,982,894 B2
(45) Date of Patent: Mar. 17, 2015

(54) COMMUNICATION SYSTEM, CONTROL STATION THEREOF AND COMMUNICATION METHOD

(75) Inventor: Daisuke Horio, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 268 days.

(21) Appl. No.: 13/281,029

(22) Filed: Oct. 25, 2011
(Under 37 CFR 1.47)

(65) Prior Publication Data
US 2012/0106561 A1     May 3, 2012

(30) Foreign Application Priority Data

Oct. 29, 2010  (JP) ................................ 2010-244285

(51) Int. Cl.
*H04L 12/28* (2006.01)
*H04J 3/16* (2006.01)
*H04B 7/14* (2006.01)
*H04W 40/00* (2009.01)
*H04W 84/18* (2009.01)

(52) U.S. Cl.
CPC ..................................... *H04W 84/18* (2013.01)
USPC ........... 370/401; 370/315; 370/346; 370/394; 455/428; 709/226

(58) Field of Classification Search
USPC ......................... 370/315–468; 709/224–231; 455/426–445
See application file for complete search history.

(56) References Cited

U.S. PATENT DOCUMENTS

| 7,027,409 | B2 * | 4/2006 | Cain .............................. 370/252 |
| 7,095,732 | B1 * | 8/2006 | Watson, Jr. .................... 370/346 |
| 7,139,527 | B2 * | 11/2006 | Tamaki et al. .................. 455/16 |
| 7,194,262 | B2 * | 3/2007 | Aoki et al. ..................... 455/428 |
| 7,218,891 | B2 * | 5/2007 | Periyalwar et al. .......... 455/13.1 |
| 7,489,668 | B2 * | 2/2009 | Cho et al. ....................... 370/338 |
| 7,606,182 | B2 * | 10/2009 | Park et al. ...................... 370/279 |
| 7,664,458 | B2 * | 2/2010 | Ishii et al. ......................... 455/7 |
| 7,792,126 | B1 * | 9/2010 | Montestruque et al. ...... 370/400 |
| 7,813,373 | B2 * | 10/2010 | Joshi et al. ..................... 370/458 |
| 8,290,429 | B2 * | 10/2012 | Imaeda ............................. 455/7 |

(Continued)

FOREIGN PATENT DOCUMENTS

| JP | 2006-186446 A | 7/2006 |
| JP | 2008-131517 A | 6/2008 |
| JP | 2009-049932 A | 3/2009 |

OTHER PUBLICATIONS

Japanese Office Action issued in corresponding application No. 2010-244285 on Apr. 14, 2014.

*Primary Examiner* — Man Phan
(74) *Attorney, Agent, or Firm* — Carter, DeLuca, Farrell & Schmidt, LLP

(57) ABSTRACT

A plurality of control stations supervise respective ones of different networks and multiple nodes belonging to each network perform redundant transmission of data. The number of communication paths for which the qualities of communication links between the nodes belonging to the network are greater than a threshold value are calculated as the number of active paths of each of the nodes belonging to each network, and it is determined whether the calculated number of active paths of each node in each network is equal to or greater than a predetermined redundancy. In case of existence of a node for which the number of active paths is less than the predetermined redundancy, then the node is moved between the network in which the node exists and another network.

14 Claims, 16 Drawing Sheets

(56) References Cited

U.S. PATENT DOCUMENTS

| | | | |
|---|---|---|---|
| 8,306,544 B2* | 11/2012 | Ishii et al. | 455/450 |
| 8,483,115 B2* | 7/2013 | Myojo | 370/315 |
| 8,503,388 B2* | 8/2013 | Ishii et al. | 370/330 |
| 2002/0071435 A1* | 6/2002 | Bolgiano et al. | 370/394 |
| 2010/0144384 A1* | 6/2010 | Kogure | 455/522 |
| 2011/0270988 A1* | 11/2011 | Inohiza | 709/226 |

* cited by examiner

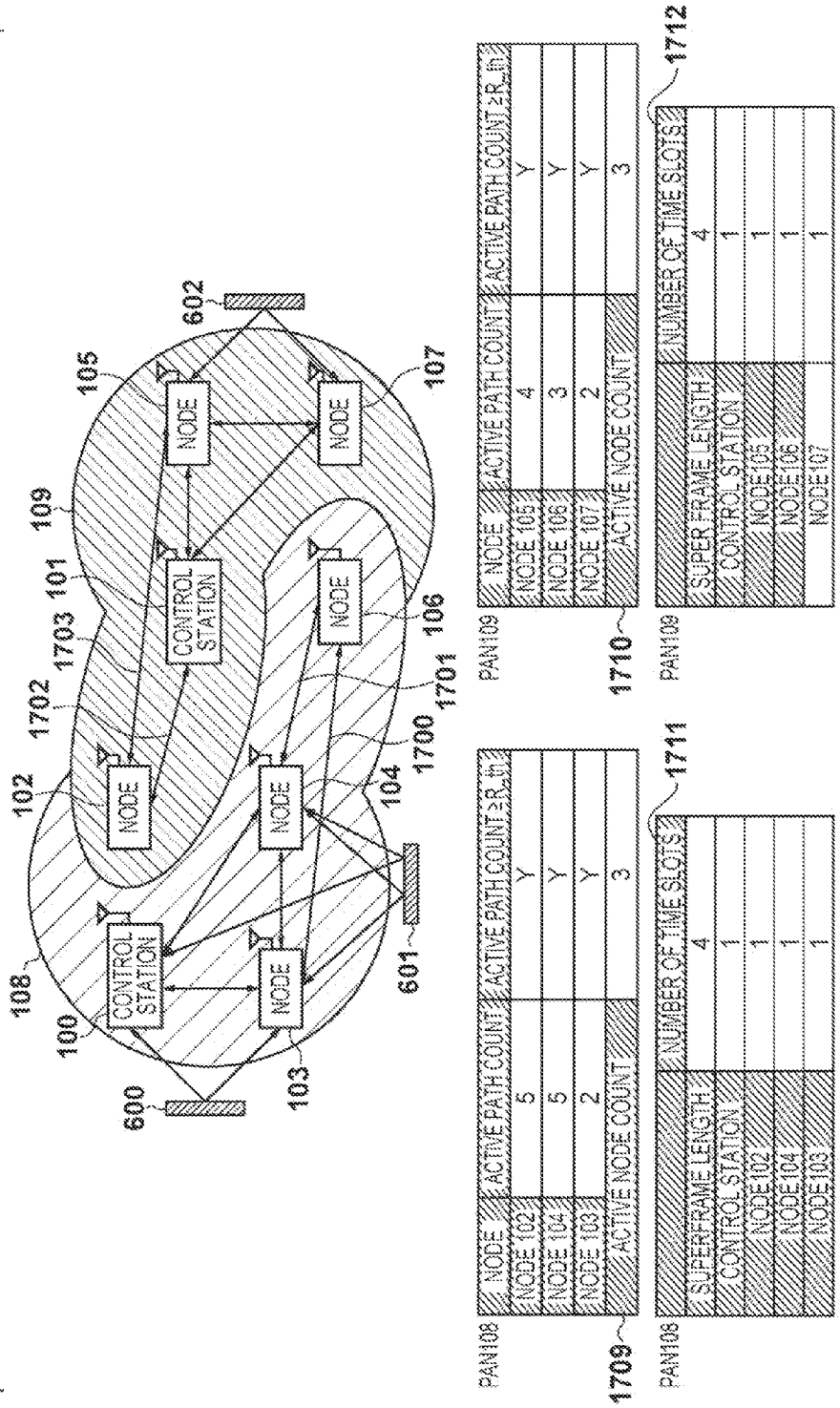

COMMUNICATION SYSTEM, CONTROL STATION THEREOF AND COMMUNICATION METHOD

BACKGROUND OF THE INVENTION

1. Field of the Invention

The present invention relates to a communication system for performing redundant communication, a control station of this system and a communication method used in the system.

2. Description of the Related Art

A milliwave wireless technique using the 60-GHz band, in which a broad bandwidth can be utilized and high-speed wireless transmission is possible, has become the focus of attention as a technique for transmitting video and audio data. However, a problem with the milliwave is that owing to the strong linearity feature thereof, communication is easily interrupted when an obstacle such as a person crosses the path of communication.

In order to deal with this problem, a technique has been proposed by which data transmitted by a node that is the source of data generation is transmitted to a destination node redundantly using multiple communication paths with the intermediary of a relay node (for example, see the specifications of Japanese Patent Laid-Open Nos. 2008-131517 and 2009-049932). By virtue of this technique, if even one communication path is interrupted, data received from another communication path is used, thereby making it possible to improve communication reliability.

The wireless transmission of a large volume of data such as 4K2K or 3D video data in real-time has been considered as a high-end manner of use that is a further extension of the above-mentioned technique, and a broad communication band is necessary in order to perform redundant transmission and achieve an improvement in reliability. As a consequence, there is an increase in the amount of information and implementation by a single PAN (Personal Area Network) is difficult. Accordingly, redundant transmission utilizing multiple PANs having different frequency bands is required.

In a case where a large volume of data is transmitted redundantly in real-time using multiple PANs, the amount of data transmitted by a single node increases and a term of validity is imposed upon the data. Consequently, there is a tendency for the nodes that communicate using a single PAN to decrease in number. That is, since the number of times relayed transmission is performed by each node when redundant transmission is carried out in each PAN decreases, the reliability obtained declines and resistance of the communication path to interruption weakens. In order to improve the quality of redundant transmission in each PAN, therefore, it is essential to deploy nodes that make it possible to positively assure high-quality communication paths.

In a case where the conventional redundant transmission system is extended to a plurality of PANs, it is necessary to perform grouping of nodes in such a manner that each node can form more than the desired number of high-quality communication paths. If the combination of nodes allocated to each PAN is poor, nodes having few communication paths to other nodes will exist and there is a possibility for the resistance of communication paths to interruption to be weakened.

SUMMARY OF THE INVENTION

The present invention provides a communication system in which multiple nodes that belong to a network under the supervision of a control station transmit data redundantly, the system performing highly reliable communication with little interruption of communication paths.

In accordance with one aspect of the present invention, there is provided a communication system in which a plurality of control stations supervise respective ones of different networks and multiple nodes belonging to each network perform a data transmission, wherein each control station comprises: an acquisition unit which acquires the number of active paths for which the qualities of communication links between the nodes belonging to the supervised network exceed a prescribed threshold value; and a moving unit which, in case of existence of a node for which the number of active paths that exceeds the prescribed threshold value is smaller than a prescribed number, moves the node between the network in which the node exists and another network.

Further features of the present invention will become apparent from the following description of exemplary embodiments (with reference to the attached drawings).

BRIEF DESCRIPTION OF THE DRAWINGS

FIG. 17 is a diagram illustrating index tables calculated by process A'.

DESCRIPTION OF THE EMBODIMENTS

An embodiment of the present invention will be described in detail with reference to the drawings. The embodiment will be described taking as an example a communication system in which groups of nodes belonging to a plurality of PANs (Personal Area Networks) that use multiple frequency channels transmit data redundantly in the form of a mesh.

Figure 1:
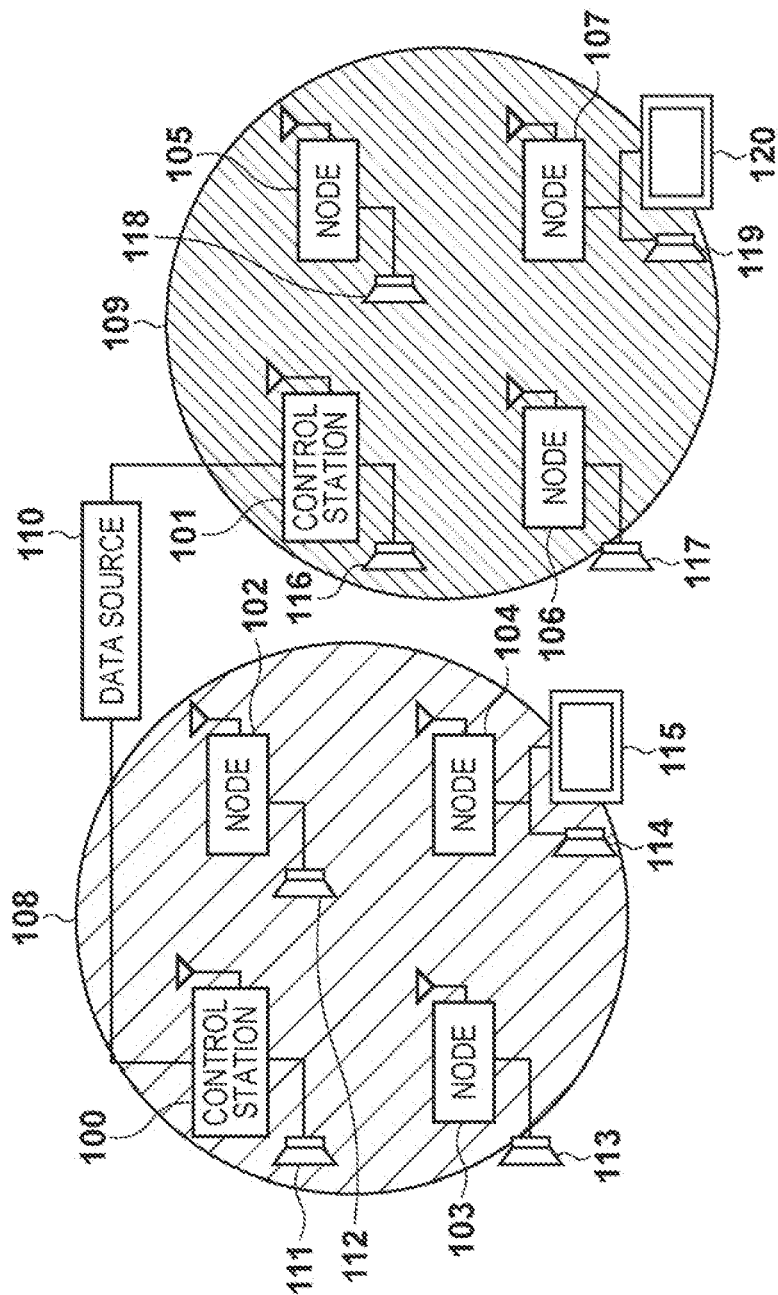
FIG. 1 is a diagram illustrating one example of the network configuration of a wireless communication system according to an embodiment of the present invention.

FIG. 1 is a diagram illustrating one example of the network configuration of a wireless communication system according to this embodiment of the present invention. In this wireless communication system, a control station 100 functions as a master control station and supervises a PAN 108, and a control station 101 functions as a slave control station and supervises a PAN 109.

The control station 100 (referred to as the master control station) decides the topology of the PAN 108 supervised by this station and that of the PAN 109 supervised by another control station, namely the control station 101 (referred to as the slave control station) in the example shown in FIG. 1. It should be noted that the master control station and slave control station perform allocation in an order detected by a data source 110. Alternatively, the master control station and the slave control station may communicate with each other to decide the allocation randomly.

The data source 110 is connected to the master control station and slave control station, and video and audio data (AV content) is wirelessly transmitted to each node of the PANs 108, 109 supervised by master and slave control stations, respectively.

The master and slave control stations need not necessarily be connected to the data source 110 directly. For example, it will suffice if the master and slave control stations are connected by cable, or wirelessly using a highly reliable modulation method and a high error-correction encoding rate, in such a manner that the stations can perform data communication with each other reliably.

The data source 110 divides the content into content to the node group belonging to PAN 108 and content to the node group belonging to PAN 109 and distributes the content to the master and slave control stations. In a case where a node moves between the PANs, the data source 110 changes the allocation of the content to the master and slave control stations based upon control data from the control stations of each of the PANs.

Nodes 104, 107 are destination nodes of video data and output video data, which has been received via a wireless link, to displays 115, 120, respectively. Speakers 111 to 114 and 116 to 119 have been connected to nodes 102 to 107, and different audio channels have been allocated. Nodes 102 to 107 extract the data of their own audio channels from the audio channels received via the wireless link and reproduce the audio by the speakers 111 to 114 and 116 to 119. Furthermore, the nodes 102 to 107 have a relay function for relaying the audio data of all received channels within each PAN.

Described below will be the structure of a communication frame when TDMA (Time Division Multiple Access) is used and redundant transmission is performed within each PAN, communication bands that are capable of assuring real-time operation in each PAN, and the communication band used by each node. It should be noted that redundant transmission is a technique for transmitting the same data to a certain destination via multiple communication paths. Since such a technique is described in the specification of Japanese Patent Laid-Open No. 2008-131517, it need not be described here. In order to simplify the description below, it will be assumed that the modulation scheme and error-correction encoding rate, etc., are fixed, and the communication band used by each node will be indicated by the number of fixed-length time slots in a TDMA communication frame.

Further, a communication band capable of assuring real-time operation in each PAN is defined as a superframe and is assumed to be a fixed-length communication frame composed of a plurality of time slots. Communication is performed in each PAN using fixed-period superframes. The superframe is the repetition period of valid intervals of the audio data and video data.

Figure 2:
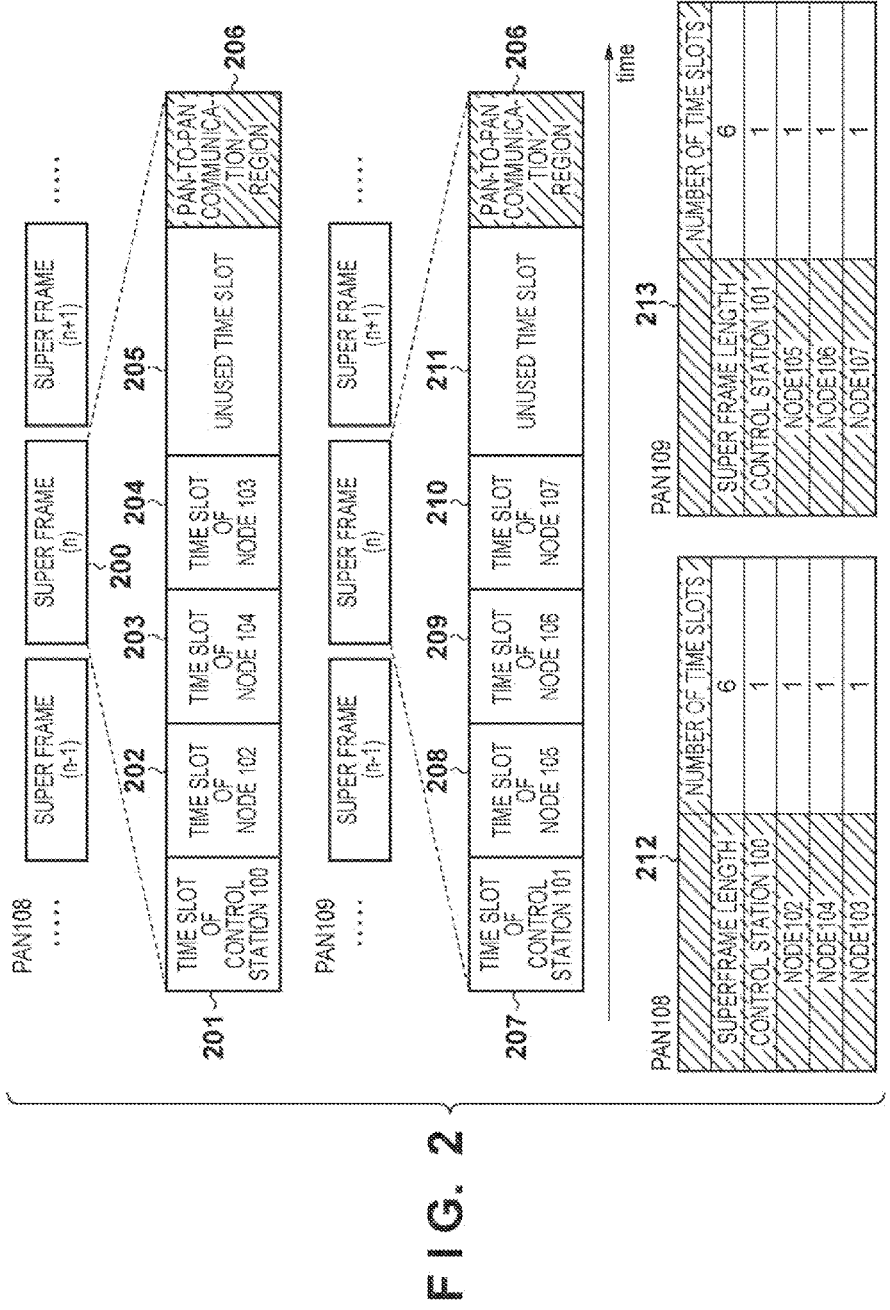
FIG. 2 is a diagram illustrating the structure of a communication frame when redundant transmission is performed using multiple PANs.

FIG. 2 is a diagram illustrating the structure of a communication frame when redundant transmission is performed by each PAN. FIG. 2 further shows the superframe length and communication bands (numbers of time slots) of the control station and nodes in each PAN.

In FIG. 2, the control stations in the PANs 108, 109 and each of the nodes perform communication synchronously in units of superframes 200. Further, in each superframe 200, data identical with data transmitted by the control station of each PAN is relayed by the nodes. In other words, in PAN 108, redundant transmission is performed using time slots 201 to 204 of the superframe, and in PAN 109, redundant transmission is performed using time slots 207 to 210 of the superframe. As shown in FIG. 2, the number of time slots representing the communication band of each node is assumed to be "1" for all of them, and the superframe length is assumed to be "6" (212, 213).

In this embodiment, the communication band used by each node will be described as being "1". In the example shown in FIG. 2, in a case where a control station and nodes are allocated per superframe in each PAN, the remaining communication band in the superframe (namely an inactive band, or unused time slots 205 and 211, of the superframes of the respective PANs) is "2", and hence it is possible to move up to two nodes. Further, communication information (redundancy) of the master and slave control stations is exchanged using a PAN-to-PAN communication region 206.

Figure 3:
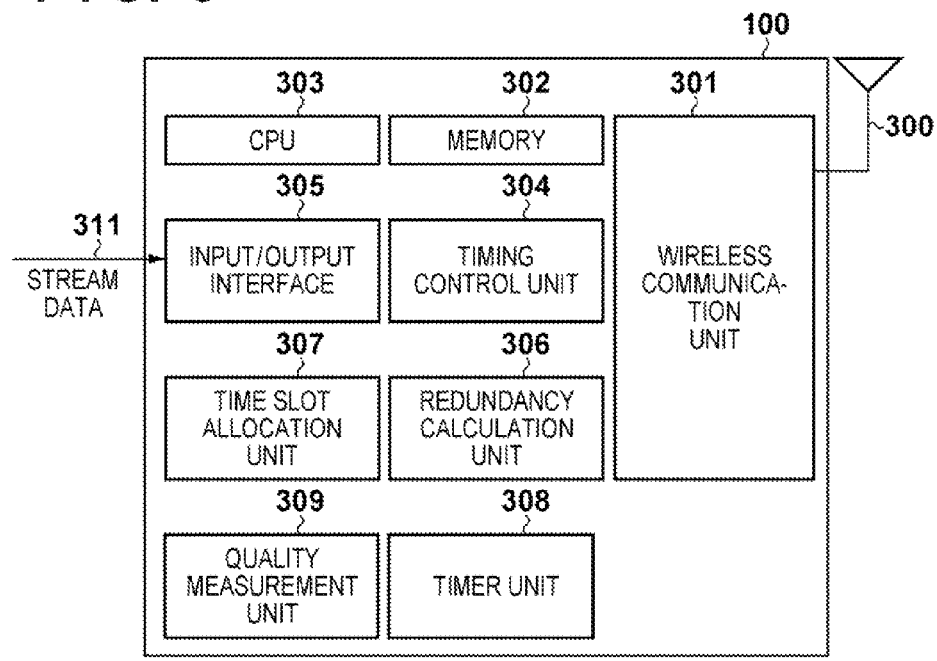
FIG. 3 is a schematic block diagram illustrating the internal structure of a master control station.

FIG. 3 is a schematic block diagram illustrating the internal structure of a master control station. It should be noted that the internal structure of the slave control station also is similar to that of the master control station. A CPU 303 executes a program that has been stored in memory and controls the overall master control station. A memory 302 stores data used by the master control station, a computer program and an index table for evaluating the PAN controlled by the master control station. The program for various operations executed by the master or slave control station is stored in the memory 302, and the various operations, described later, are performed by having the CPU 303 execute the program stored in the memory 302.

A wireless communication unit 301 modulates transmission data into a wireless signal and transmits the signal to each node via an antenna 300. A wireless signal received via the antenna 300 is demodulated to reception data. Stream data 311 that has been output from the data source 110, which is an external apparatus, is input to an input/output interface 305, which performs a format conversion and generates data applied to each node.

A timing control unit 304 synchronizes the timing of each time slot by cooperating with the timing control units of the plurality of nodes included in PAN 108, and synchronizes the timing of the superframe by cooperating with the slave control station that supervises PAN 109.

A quality measurement unit 309 measures the quality of the communication link between nodes by cooperating with the quality measurement units of the plurality of nodes included in PAN 108 (PAN 109) supervised by the master control station (slave control station). A redundancy calculation unit 306 calculates the number of active paths from the quality measured by the quality measurement unit 309 and the quality measured by each node within PAN 108 (PAN 109) controlled by the master control station (slave control station) and evaluates the redundancies within PANs 108, 109 based upon an algorithm, described later. The master control station exchanges the redundancy with the slave control station of PAN 109 through the wireless communication unit 301 and judges that redundancy is not being maintained if the number of active paths has fallen below a predetermined threshold value. In order to restore redundancy, the master control station selects a node, which will be caused to move, from PAN 108 or PAN 109 and notifies the slave control station of the rearrangement of the nodes. Here the redundancy is the number of paths for which the communication quality is higher than a prescribed threshold value and which are effective in communication.

A time slot allocation unit 307 allocates the node selected by the redundancy calculation unit 306 to a time slot within the PAN. Further, the time slot allocation unit 307 notifies the input/output interface 305 of a node selected from PAN 109 and adds the data of the selected node to the data sent to each node.

Figure 4:
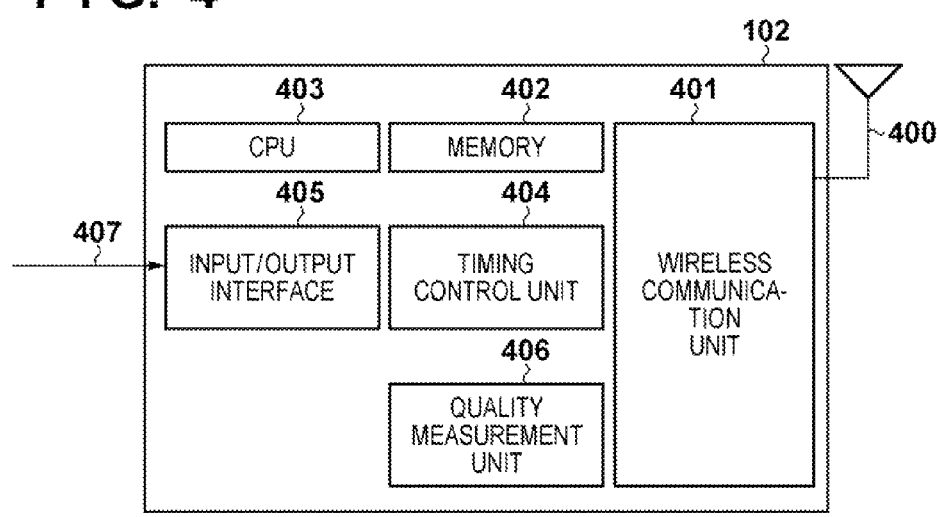
FIG. 4 a schematic block diagram illustrating the internal structure of a node 102.

FIG. 4 is a schematic block diagram illustrating the internal structure of node 102. It should be noted that the internal structures of the other nodes 103 to 107 are similar to the internal structure of node 102. A CPU 403 executes a program that has been stored in memory and exercises overall control of node 102. A memory 402 stores data used by node 102 and a computer program, etc. The program for various operations executed by each node is stored in the memory 402, and the various operations, described later, are performed by having the CPU 403 execute the program stored in the memory 402.

Via an antenna 400, a wireless communication unit 401 modulates and transmits data to the control station and to each node of the PAN to which this node belongs, or receives and demodulates data. An input/output interface 405 extracts the data of its own node from demodulated received data and performs a signal format conversion in conformity with the external device.

A timing control unit 404 synchronizes the timing of each time slot by cooperating with the control stations contained in each of the PANs. A quality measurement unit 409 measures the quality of the communication link by cooperating with the other nodes included in the PAN and with each of the control stations.

Figure 5:
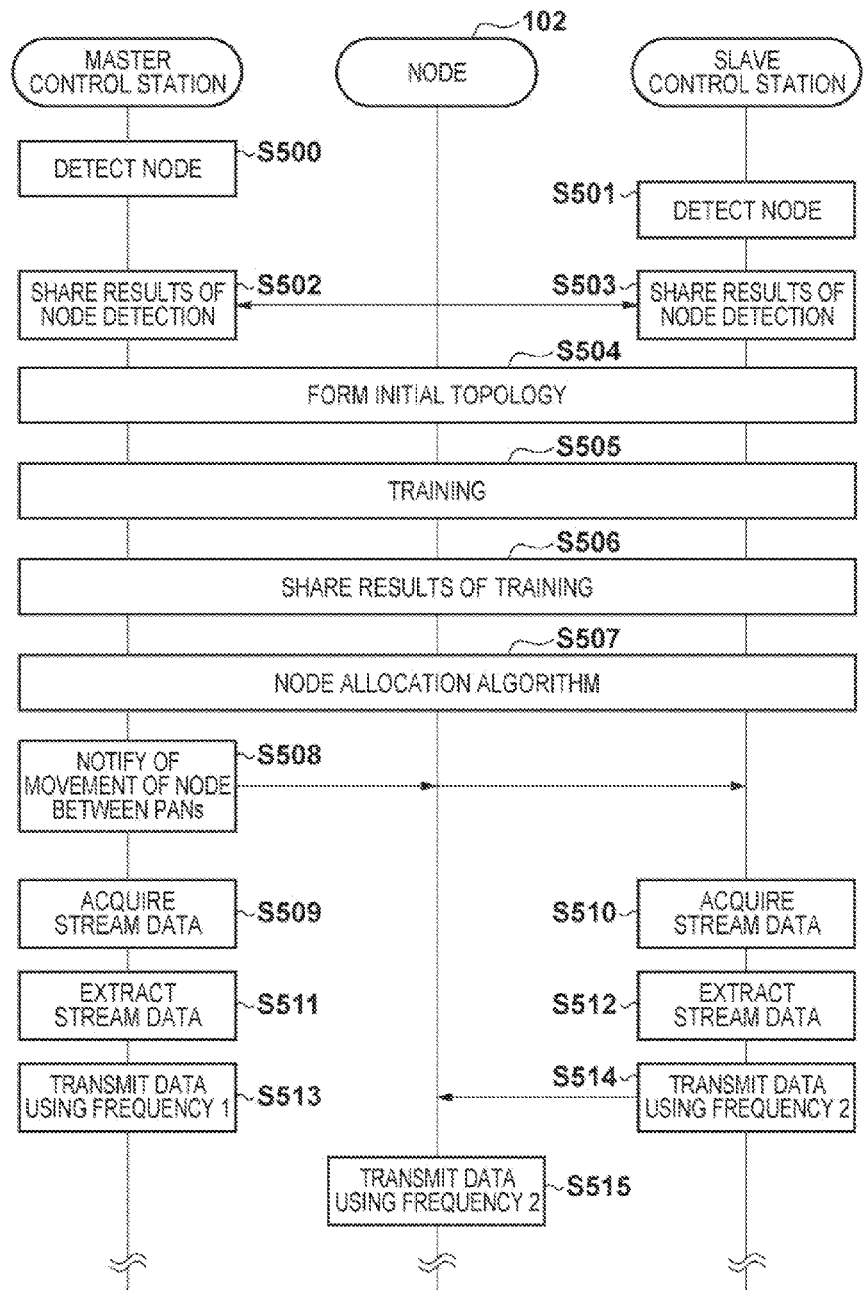
FIG. 5 is a diagram illustrating the operating sequences of control stations and a node.

FIG. 5 is a diagram illustrating the operating sequences of control stations and a node. In order to simplify the description, FIG. 5 illustrates only the sequences of the master control station, slave control station and node 102. However, the configuration of the communication system is as shown in FIG. 1. The other nodes are allocated to either PAN 108 or 109 and redundant transmission is performed in each PAN.

First, the master control station performs node detection within the PANs 108, 109 at frequencies 1 and 2 (step S500), and the slave control station similarly performs node detection within the PANs 108, 109 at frequencies 1 and 2 (step S501). When node detection ends, the node information detected by each control station is shared by the master control station and slave control station (steps S502, S503).

Next, the master control station allocates a detected node to PAN 108 which, under the supervision of its own station, performs redundant communication using frequency 1. On the other hand, the slave control station also allocates a detected node to PAN 109 which, under the supervision of its own station, performs redundant communication using frequency 2. As a result, the initial PAN configuration (initial topology) is formed (step S504). It should be noted that the details of processing for forming the initial topology will be described later with reference to FIGS. 6 and 7.

The master control station calculates the communication band used by each node and allocates nodes in the detected order in such a manner that the upper limit of the communication band of each PAN will not be exceeded. Further, nodes detected only by the slave control station are allocated to PAN 109 and, similarly, nodes detected only by the master control station are allocated to PAN 108.

Next, it will be assumed that node 102 has been allocated to PAN 108 of the communication system shown in FIG. 1, and the operating sequences of the control stations and of all nodes after the formation of the initial topology will be described in detail.

First, the master control station, slave control station and all the nodes 102 to 107 in the communication system perform training using frequencies 1 and 2 and detect all communication paths at frequencies 1 and 2 (step S505). Here "training" means detecting communication paths between all nodes in the network and deciding information necessary for communication, such as antenna direction, when data is sent and received over communication paths.

When training ends, the results of training are shared by each of the control stations and by all of the nodes (step S506). The redundancy in each PAN is then evaluated based upon the number of active nodes in each PAN, and the optimum node allocation is decided in each PAN (step S507). The details of node allocation algorithm will be described later using a flowchart and an example of a node allocation operation.

As a result of execution of the node allocation algorithm, the selected node is notified of movement between PANs (step S508) and the selected node is moved to the other PAN. Here it is assumed that the node 102 is selected and moved from PAN 108 to PAN 109 in order to achieve redundancy in PAN 109. It should be noted that "move" here does not mean physical movement of position but signifies changing the PAN to which the node belongs.

Next, each control station receives stream data from the data source 110 (steps S509, S510) and extracts the data of the nodes belonging to each PAN from the received stream data (steps S511, S512). The control stations transmit the data utilizing the different frequencies 1 and 2 (step S513, S514). Accordingly, node 102 extracts data necessary for its own station from the data received from the slave control station and relays the received data to other nodes that belong to PAN 109 (step S515). Thereafter as well, the nodes in PAN 109 extract data necessary for their own station and relay the received data. A similar redundant transmission is performed in PAN 108 as well.

Figure 6:
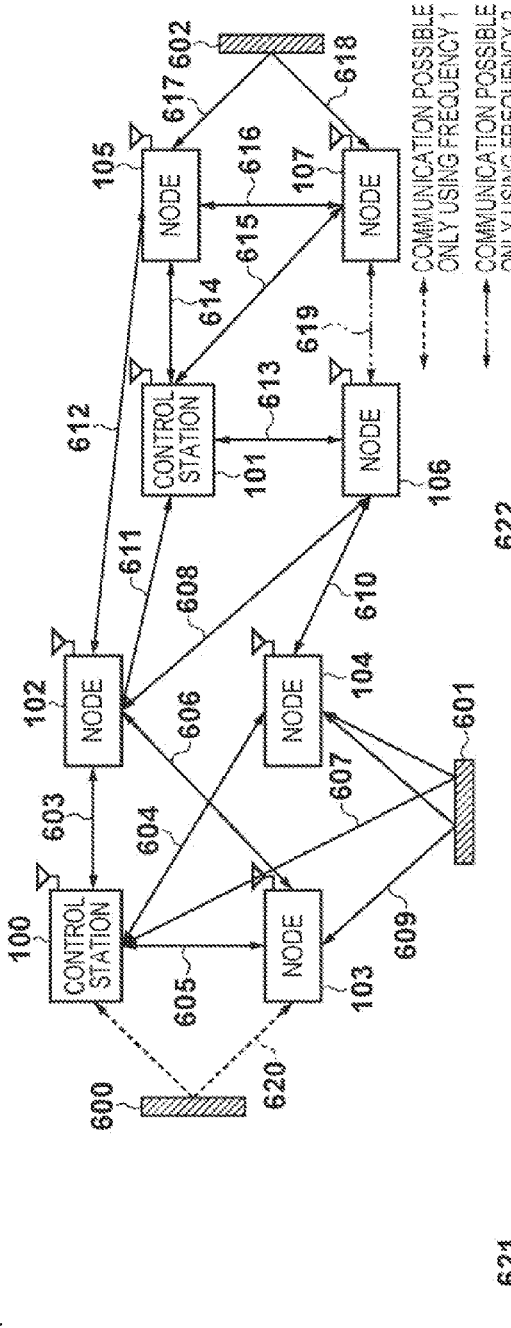
FIG. 6 is a diagram illustrating an example of result of training using frequencies 1 and 2.

A method of forming an initial topology will be described in detail with reference to FIGS. 6 and 7. FIG. 6 is a diagram illustrating an example of result of training using frequencies 1 and 2. Communication paths 603 to 618 shown in FIG. 6 are communication paths for which the communication quality is greater than a threshold value at frequencies 1 and 2. Further, communication on a communication, path 620 is possible only at frequency 1, and communication on a communication path 619 is possible only at frequency 2. Here the communication paths also include paths along which reflection occurs owing to reflecting obstacles 600 to 602.

A table 621 shown in FIG. 6 represents the active paths of each node up to the master control station in a case where frequency 1 is used. For example, an F1 path 1 represents a communication path that arrives at the master control station from node 102 via node 103. Further, the total number of active paths for every node is shown in the ninth line as the number of active paths. Similarly, a table 622 shown in FIG. 6 represents the active paths up to the slave control station in a case where frequency 2 is used.

Here the paths 620 and 619 on which communication is possible only at frequency 1 or frequency 2 exist. When the tables 621, 622 of the active paths are created, therefore, the frequency used by each supervised PAN is decided so as to maximize the number of active paths to the master control station and slave control station. It should be noted that if there is no difference between the numbers of active paths to the master control station and slave control station, then the frequency allocation is decided from the quality of each active path or is decided randomly.

The master control station decides the network allocation of multiple nodes within the communication system based upon the information in the tables 621 and 622. First, the master control station selects node 102, which has the highest frequency of passage therethrough and an early order of detection, in the table 621 as a node of PAN 108.

Next, in table 622, the master control station selects node 107, which has the highest frequency of passage therethrough among the active paths to the slave control station with the exception of the communication paths (the seventh and eighth lines in table 622) that pass through node 102, as a node of PAN 109. At this time the number of active paths of each node is decremented in accordance with the active paths that have been excluded. Thus, nodes are selected from the tables 621, 622 alternatingly and the allocation of the nodes of each PAN is decided to thereby form the initial topology.

Figure 7:
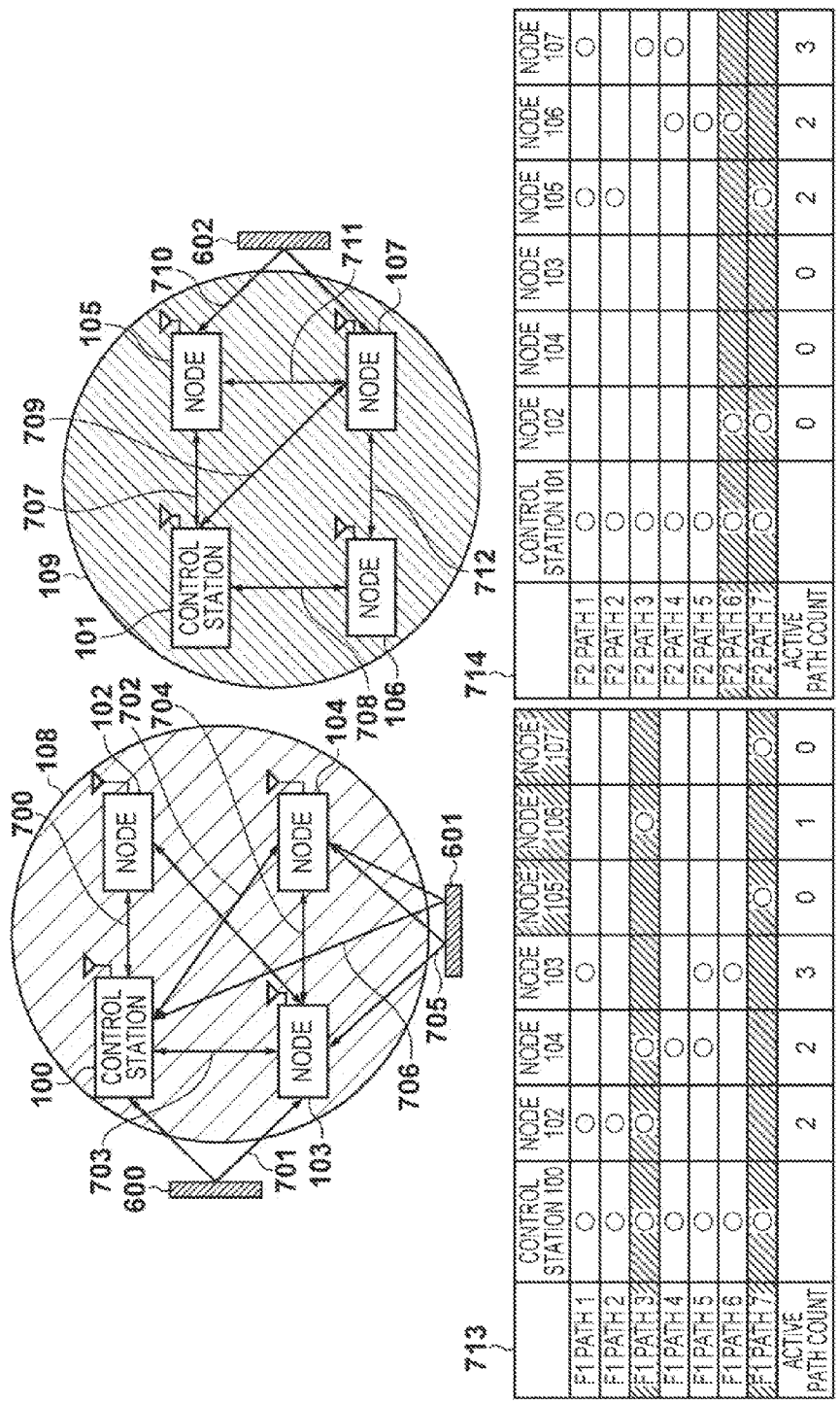
FIG. 7 is a diagram illustrating initial topology, active paths, status of passage through each node and number of active paths of each node.

FIG. 7 illustrates initial topology, active paths, status of passage through each node and number of active paths of each node. Active paths indicated by hatching in tables 713 and 714 are active paths excluded at the time of node selection. Nodes 102 to 104 are allocated from tables 713, 714 to PAN 108 supervised by the master control station using frequency 1. Nodes 105 to 107 are allocated to PAN 109 supervised by the slave control station using frequency 2. The foregoing is one example of a method of forming the initial topology. When the initial topology is formed, the nodes may just as well be allocated to each of the PANs alternately in the order in which they are detected.

Next, the node allocation algorithm in PANs 108 and 109 will be described with reference to FIGS. 8 to 12. It should be noted that in the initial topology shown in FIG. 7, nodes are allocated beforehand in such a manner that the desired redundancy will be achieved in each PAN. Therefore, in order to describe the node allocation algorithm, the state illustrated in FIG. 8 will be described as the initial topology. Further, it will be assumed that the communication topology shown in FIG. 8 is formed by allocating nodes to each PAN alternatingly in the order in which they are detected when the initial topology is formed or by changing the state of communication after the formation of the initial topology.

Figure 8:
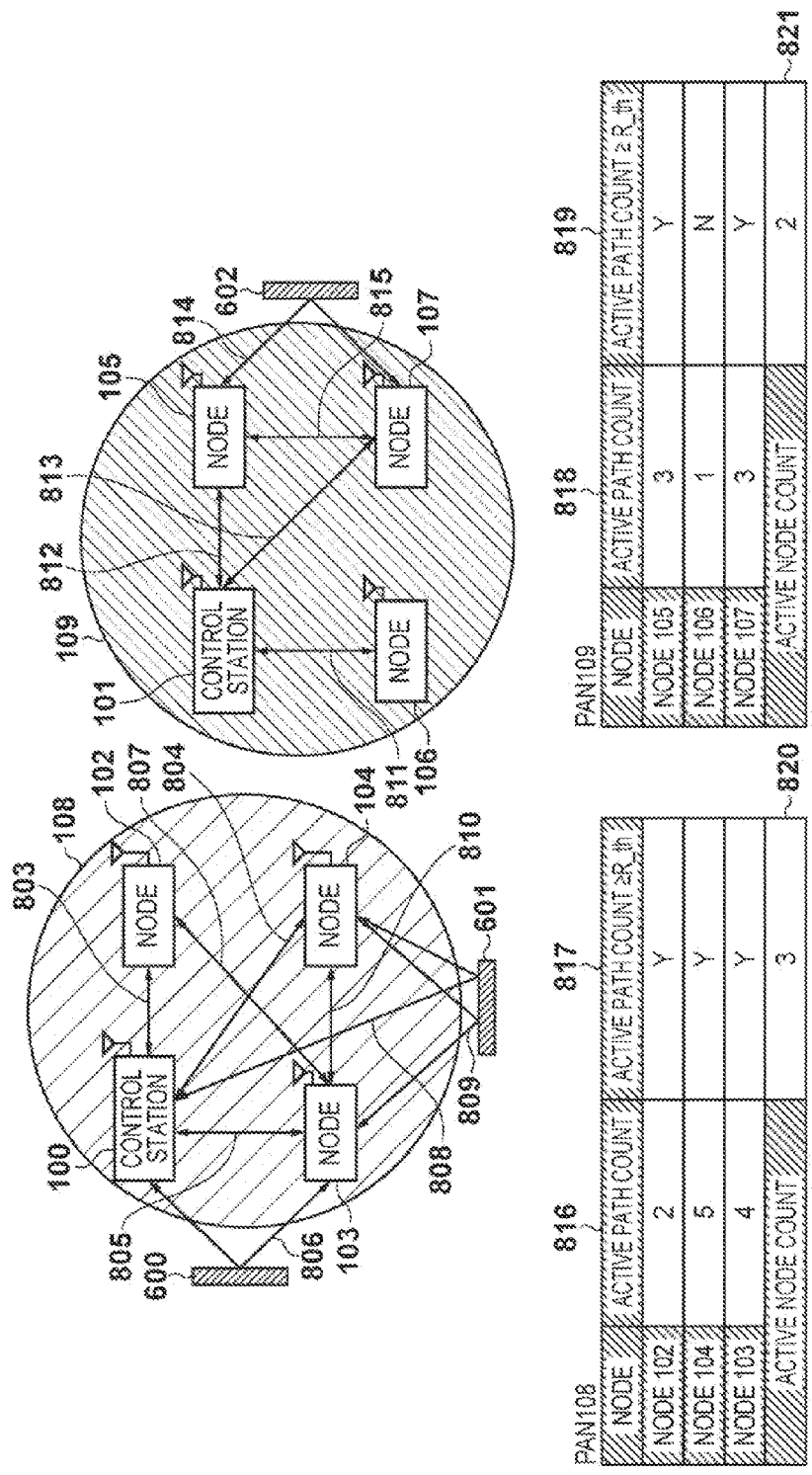
FIG. 8 is a diagram illustrating initial topology at step S504.

FIG. 8 is a diagram illustrating initial topology at step S504. PANs 108 and 109 form communication paths 803 to 814 whose reception signal strengths, which are shown in FIG. 8, are greater than a prescribed threshold value RSSI_th. Further, the tables shown in FIG. 8, which are examples of calculation of indices in each of the PANs used by the node allocation algorithm described below, consist of the number of active paths at each node, a comparison between a predetermined redundancy and a number of active paths at each node, and number of active nodes.

Figure 9:
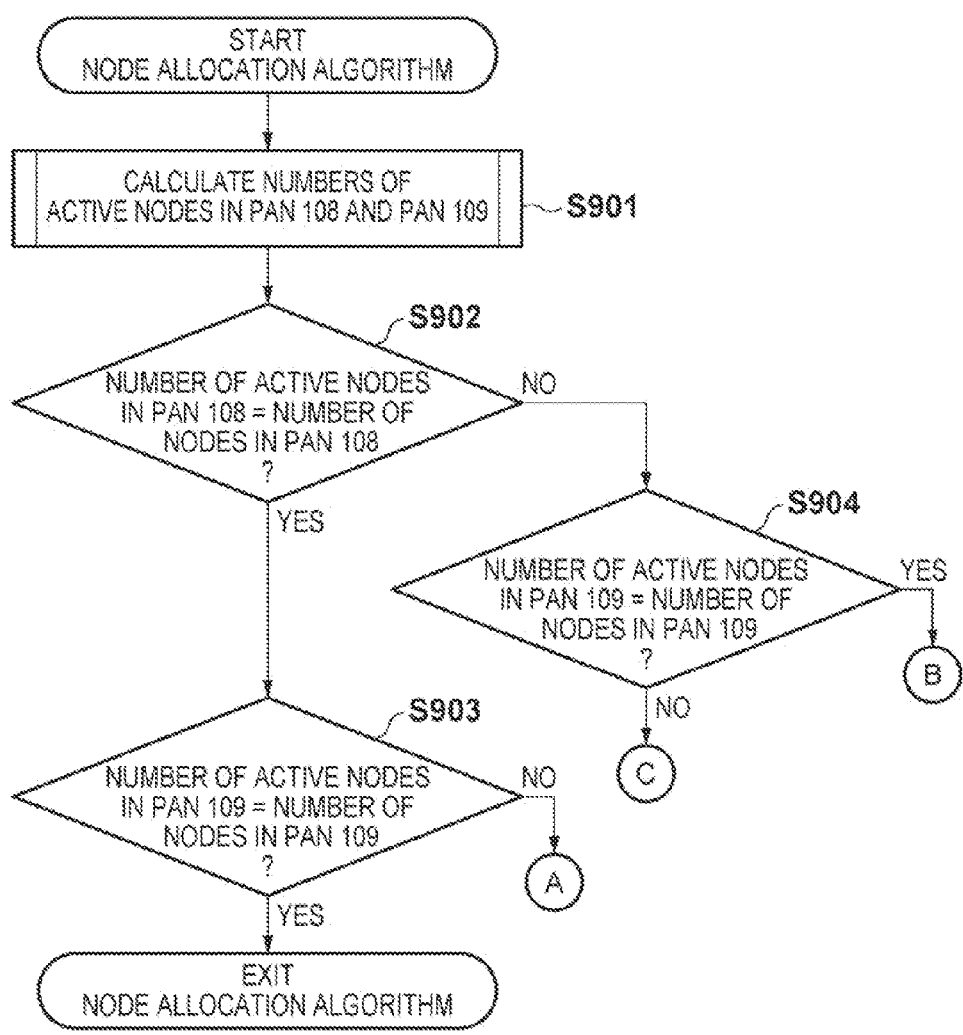
FIG. 9 is a flowchart of a node allocation algorithm at step S507.

FIG. 9 is a flowchart of a node allocation algorithm at step S507. This processing is started by having the CPU 303 of the master control station execute a computer program (the node allocation program) that has been written to the memory 302.

First, the master control station calculates the numbers of active nodes in the PANs 108 and 109 (step S901). It should be noted that the calculation of the number of active nodes is performed by using the training information at step S505 to select and count all active paths among the communication paths, which lead up to the control stations, at each node. As a result, active path counts 816, 818 at each node take on the respective values shown in FIG. 8.

Next, the master control station compares the number of active paths and a predetermined redundancy Rth at each node and decides active node counts 820, 821 based upon results 817, 819 of the comparison. If the redundancy R_th is "2", then the active node count 820 of PAN 108 is "3" and the active node count 821 of PAN 109 is "2".

Next, the master control station compares the calculated active node count 820 of PAN 108 and the total node count within PAN 108 (step S902). If the result of the comparison is that the counts are equal, then the master control station compares the active node count of PAN 109 and the total node count within PAN 109 (step S903). If the result of the comparison is that the counts are equal, then all nodes within the PAN 108 and PAN 109 assure a number of active paths greater than the redundancy and it can be determined that the desired redundancy has been achieved in each PAN. As a result, the master control station terminates the node allocation algorithm.

If the result of the comparison of the active node nodes in the PANs 108 and 109 is other than the above-mentioned condition for terminating the algorithm, the flowchart branches at each of the three other conditions and processing will differ depending upon each branch (that is, processes A, B or C will be executed). Conditional equations at the respective three branches will be illustrated in order, and the processes A to C corresponding to the respective branches will be described with reference to flowcharts and examples of operation.

<Process A>

If the result of the determination rendered at step S902 is "YES" and that rendered at step S903 is "NO", then the conditions of Equations (1) and (2) hold and the master control station executes process A. In the case of these conditions, the desired redundancy has been achieved in PAN 108 but, in PAN 109, node 106 cannot assure a number of active paths greater than the redundancy and the desired redundancy is not achieved.

$$\text{(number of active nodes of PAN } \mathbf{108}\text{)}=\text{(number of nodes of PAN } \mathbf{108}\text{)} \quad \text{Equation (1)}$$

$$\text{(number of active nodes of PAN } \mathbf{109}\text{)}\neq\text{(number of nodes of PAN } \mathbf{109}\text{)} \quad \text{Equation (2)}$$

Figure 10:
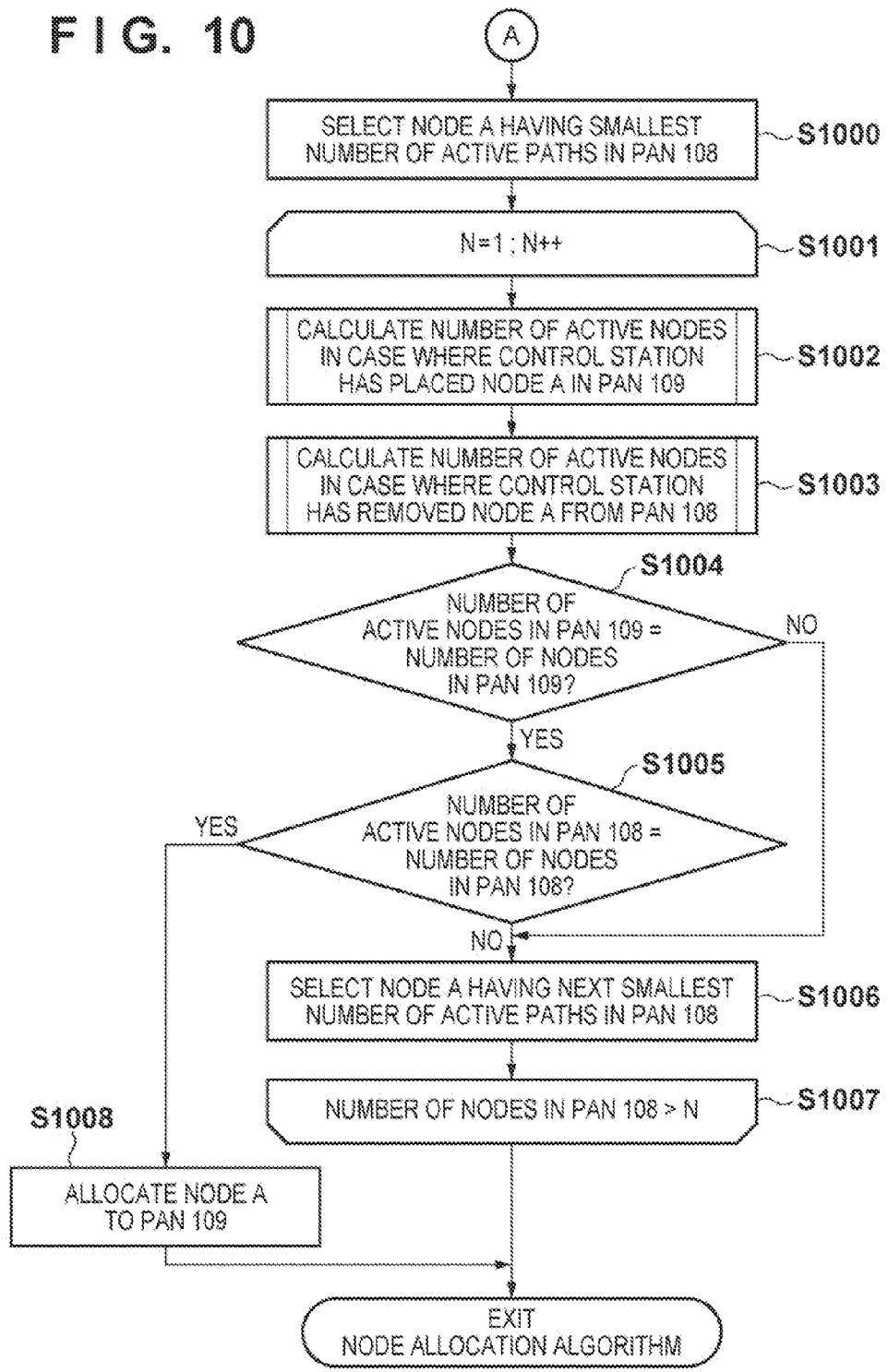
FIG. 10 is a flowchart illustrating a process A.
Figure 13:
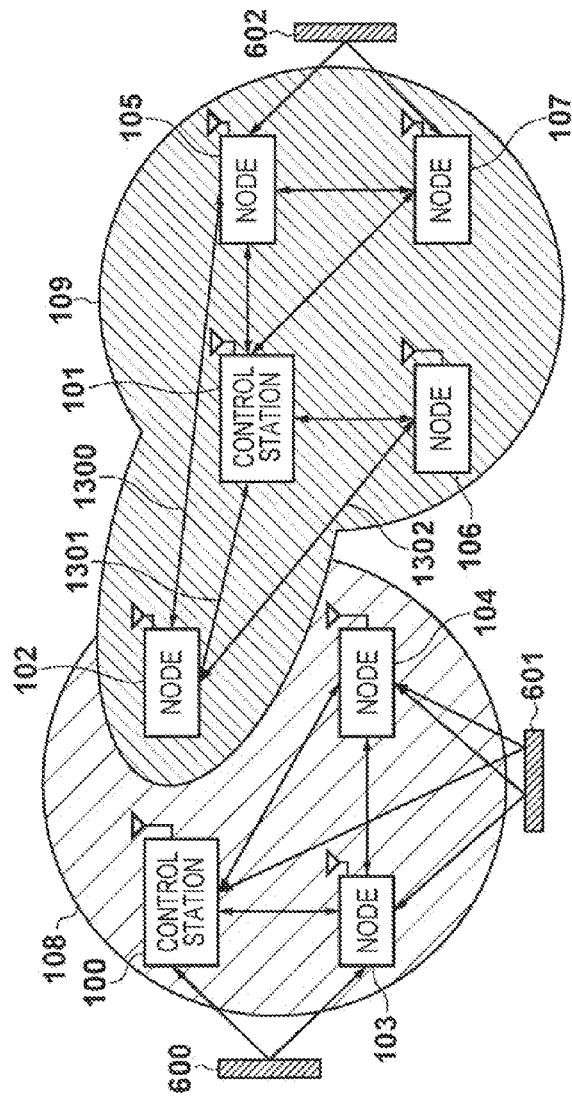
FIG. 13 is a diagram illustrating index tables calculated from results of processing of this embodiment.

The flowchart of process A is shown in FIG. 10. Further, an example of operation of the communication system will be described assuming that the initial topology is shown in FIG. 8, with FIG. 13 illustrating the topology after application of the node allocation algorithm. Further, the examples of operation of the node allocation algorithm described from here onward all assume a case where the redundancy R_th is "2".

In process A, first the master control station selects the node ("node A" below) having the smallest number of active paths in PAN 108 (step S1000). When node A is selected, it is necessary to take into consideration the remaining communication band of PAN 109. That is, in a case where the master control station selects node A from PAN 108 and moves it to PAN 109, node A is required to be selected in such a manner that the real-time nature of PAN 109 is not lost. The communication band used by each node is as described above with reference to FIG. 2.

In the initial topology of PAN 108 shown in FIG. 8, node 102, which has the smallest number of active paths among the number of active paths indicated at 816, is selected at node A. The communication band used by node 102 is "1" in FIG. 2. In a case where node A is moved to PAN 109, it is judged that movement is possible because the inactive band "2" in the superframe will not be exceeded.

Next, the master control station calculates the number of active nodes in a case where node 102 selected as node A has been introduced to PAN 109 (step S1002). Further, the master control station calculates the number of active nodes in a case where node 102 has been removed from PAN 108 (step S1003). The reason for this is to investigate the effect of movement of node 102 from PAN 108 to PAN 109 on the redundancy of PAN 108.

FIG. 13 illustrates index tables calculated from the results of processing at step S1002 and S1003. Owing to introduction of node 102 to PAN 109 FIG. 13, the number of active paths of node 106 is "2" and the number of active nodes in PAN 109 is "4". It should be noted that the number of active paths of node 104 is reduced by moving node 102 from PAN 108. However, each number of active paths maintains the redundancy T_th at "2" or higher, the effective number of nodes in PAN 108 is "2" and redundancy is achieved in both PAN 108 and PAN 109.

Next, the master control station compares the calculated number of active nodes in each PAN with the total number of nodes in each PAN (steps S1004, S1005). In the index tables of FIG. 13, the number of active nodes of PAN 109 is "4", and this agrees with the total number "4" of nodes in PAN 109, inclusive of the node 102 to be moved. The desired redundancy, therefore, can be achieved in PAN 109. On the other hand, the number of active nodes in PAN 108 is "2", and this agrees with the total number of nodes in PAN 108 from which node 102 is excluded. The desired redundancy, therefore, can be maintained. Accordingly, the master control station re-allocates the node 102 from PAN 108 to PAN 109 (step S1008) and ends processing.

In a case where the number of active nodes in each PAN does not agree with the number of nodes in each PAN when node A is moved to PAN 109, the master control station adopts the node having the next smallest number of active paths in PAN 108 as node A, re-calculates the number of active nodes in each PAN and performs the comparison again (step S1006). The master control station performs this processing repeatedly until the number of active nodes in each PAN and the number of nodes in each PAN become equal or until processing has been executed with regard to all nodes in PAN 108 (steps S1001 to S1007). It should be noted that if the processing for calculating and comparing the numbers of active paths is tried with regard to all nodes within PAN 108 and the numbers of active nodes in PAN 108 and PAN 109 do not agree with the total number of nodes in each PAN, then the master control station terminates this processing without moving a node to PAN 109.

<Process B>

Figure 11:
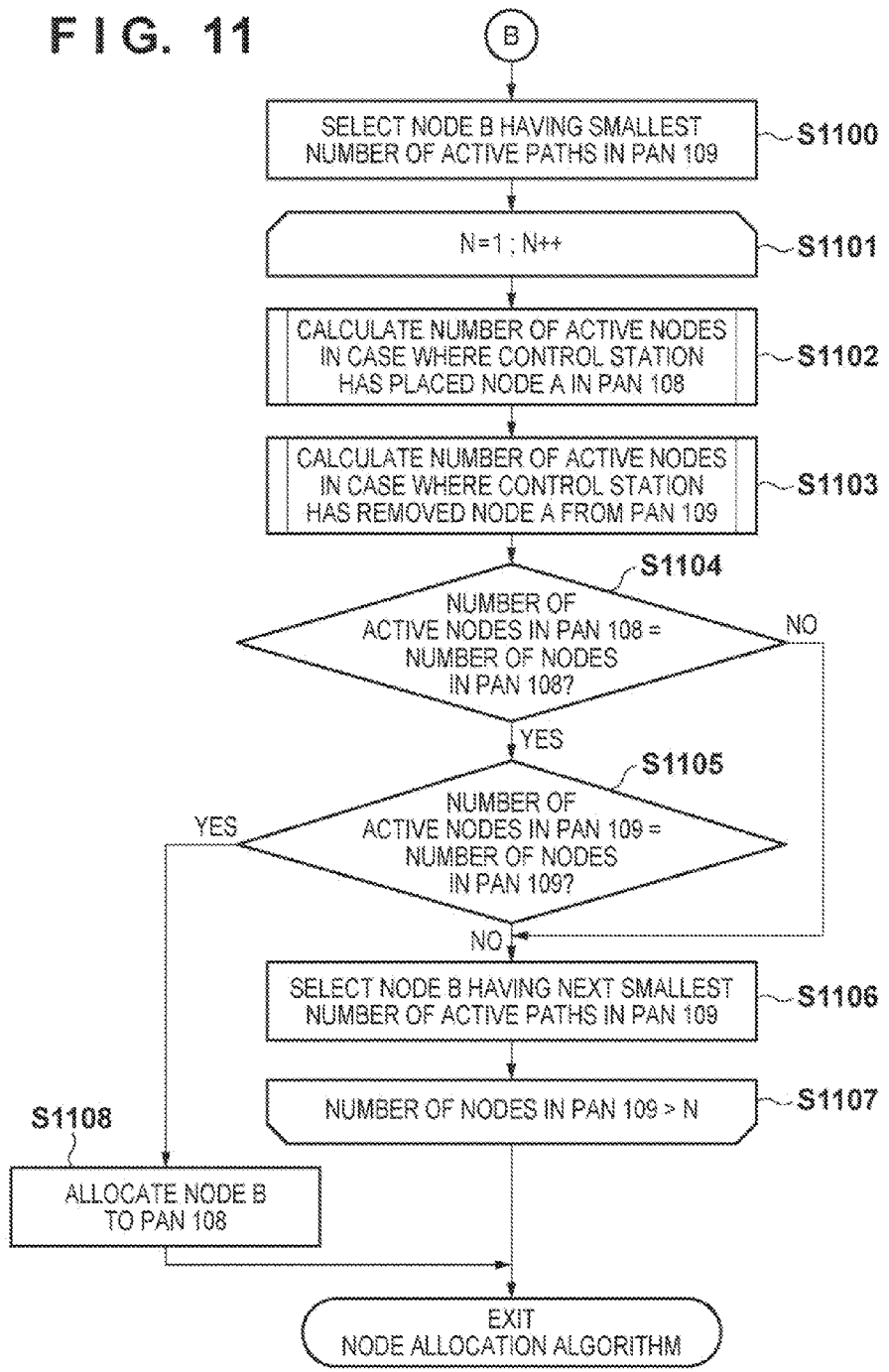
FIG. 11 is a flowchart illustrating a process B.

FIG. 11 illustrates the flowchart of process B. Process B is a process for a case where the PAN in which the desired redundancy cannot be achieved is the reverse of that in process A and the details of this operation need not be described again. Process B is a process for a case where the redundancy of PAN 108 has not been maintained, as indicated by conditional Equations (3), (4) below.

$$(\text{number of active nodes of PAN } \mathbf{108}) \neq (\text{number of nodes of PAN } \mathbf{108}) \quad \text{Equation (3)}$$

$$(\text{number of active nodes of PAN } \mathbf{109}) = (\text{number of nodes of PAN } \mathbf{109}) \quad \text{Equation (4)}$$

<Process C>

Figure 12:
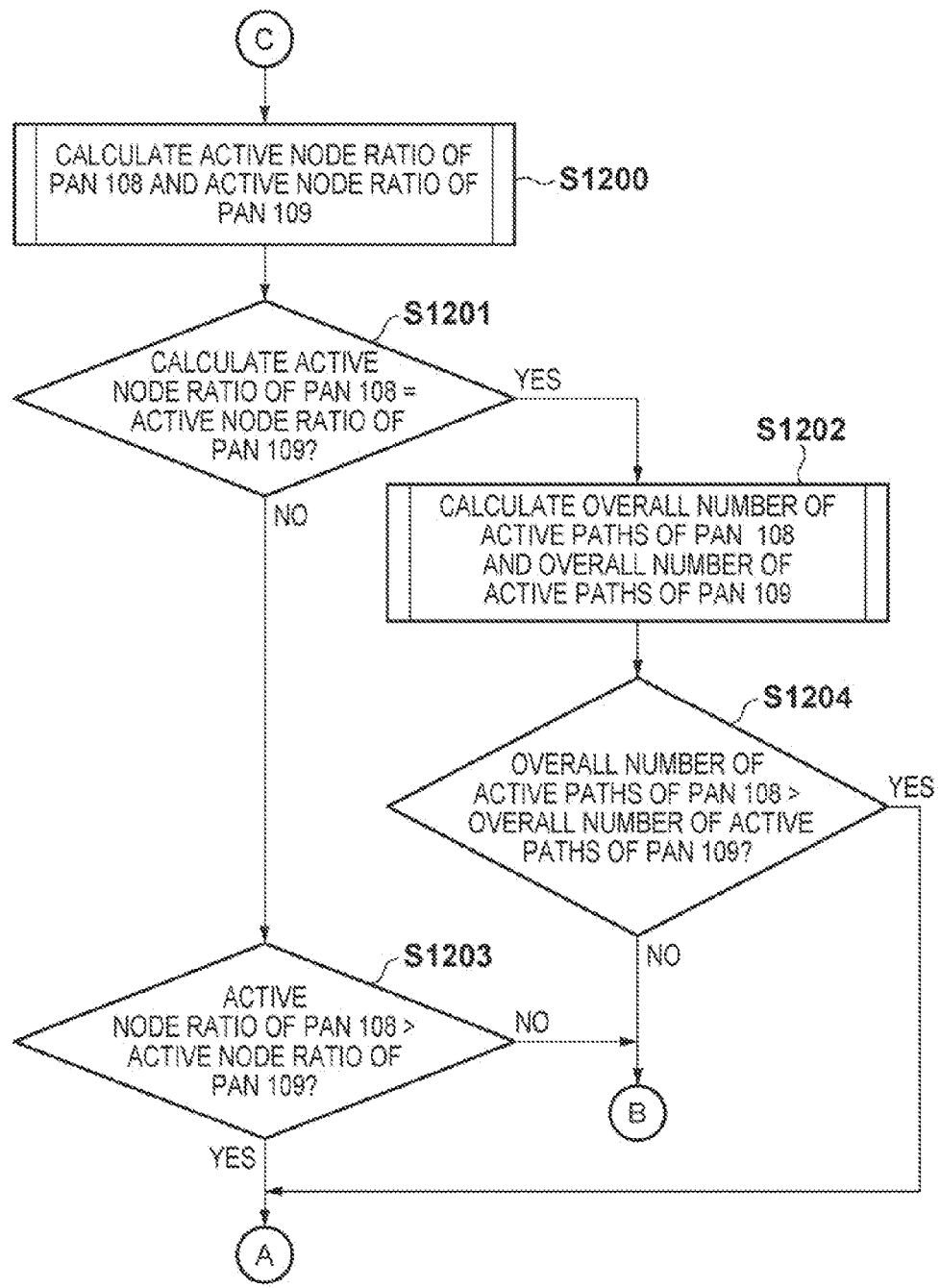
FIG. 12 is a flowchart illustrating a process C.
Figure 14:
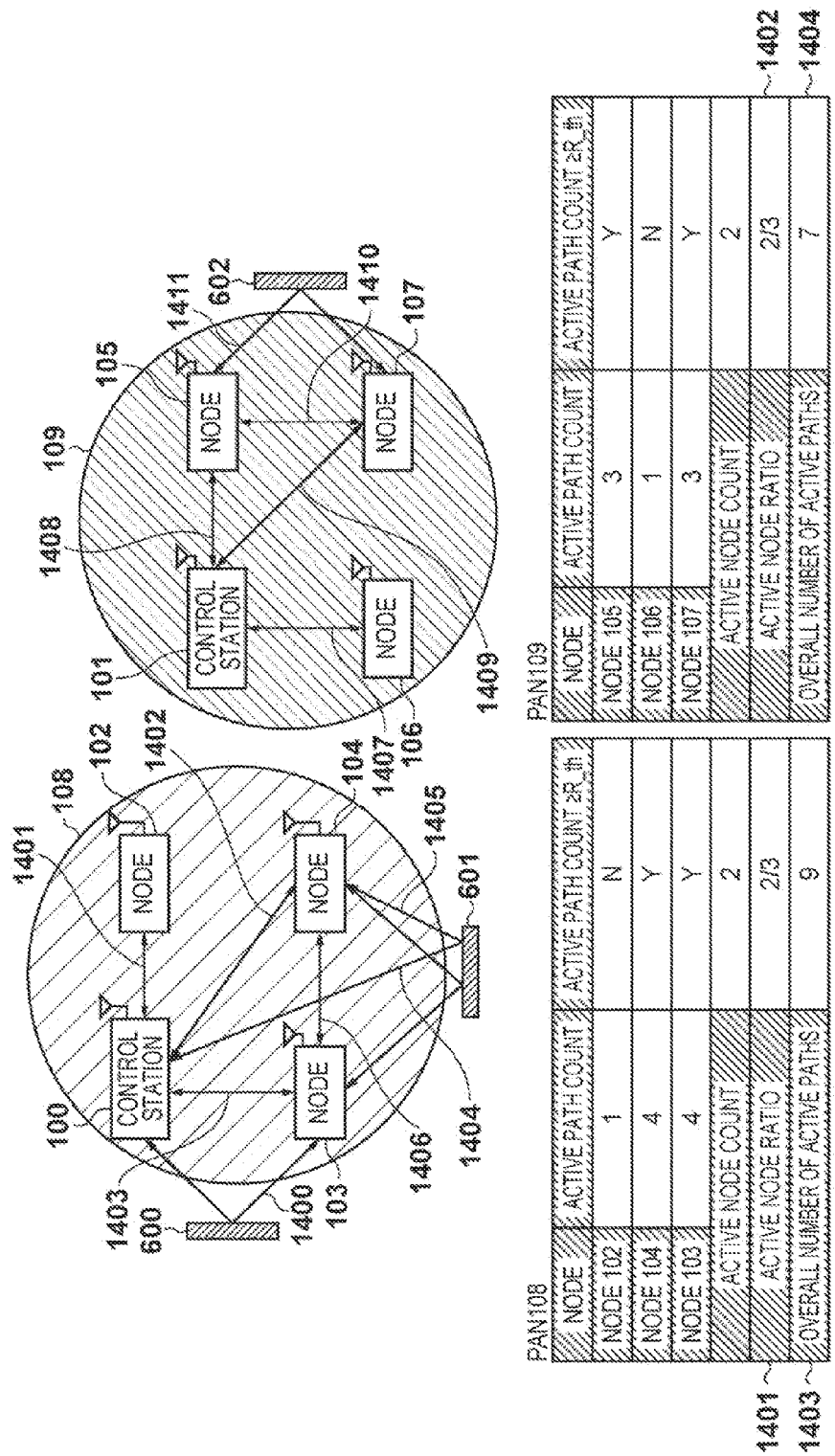
FIG. 14 is a diagram illustrating initial topology of process C.

Next, process C will be described using the flowchart of FIG. 12 and initial topology shown in FIG. 14. Further, index tables relating to the initial topology of each of the PANs are illustrated in FIG. 14. Process C is a process for a case where the desired redundancy has not been achieved in both PAN 108 and PAN 109, as indicated by conditional Equations (5), (6) below.

$$(\text{number of active nodes of PAN } \mathbf{108}) \neq (\text{number of nodes of PAN } \mathbf{108}) \quad \text{Equation (5)}$$

$$(\text{number of active nodes of PAN } \mathbf{109}) \neq (\text{number of nodes of PAN } \mathbf{109}) \quad \text{Equation (6)}$$

First, the master control station calculates the active node ratio of PAN 108 and the active node ratio of PAN 109 (step S1200) and compares the active node ratios of the PANs (step S1201). Here the "active node ratio" is the ratio of the number of active nodes to the total number of nodes in the PAN and is defined by the following equation:

$$(\text{active node ratio}) = (\text{number of active nodes})/(\text{number of nodes in PAN}) \quad \text{Equation (7)}$$

In the initial topology shown in FIG. 14, active node ratios 1401, 1402 in the respective PANs are equal and both are "⅔". If the result of the determination at step S1201 is "NO", control proceeds to step S1203. Here the master control station compares the active node ratio of PAN 108 and the active node ratio of PAN 109 and executes the above-described process A or process B depending upon the result of the comparison. That is, processing for moving a node from the PAN having the larger active node ratio (larger number of active nodes) to the PAN having the smaller active node ratio (the smaller number of active nodes) to thereby achieve the desired redundancy is executed.

Further, if the result of the determination at step S1201 is "YES", control proceeds to step S1202. Here the master control station calculates the overall number of active paths of the PAN 108 and of the PAN 109. The overall number of active paths is obtained by adding together the number of active paths in each PAN.

The master control station then compares the overall number of paths of PAN 108 and the overall number of paths of PAN 109 and executes the above-described process A or process B depending upon the result of the comparison. That is, the master control station executes processing for selecting a node from the PAN having the larger overall number of active paths and moving the node to the other PAN.

In the initial topology shown in FIG. 14, the overall number of active paths of PAN 108 at 1403 is "9", and the overall number of active paths of PAN 109 at 1404 is "7". Since the overall number of active paths of PAN 108 is larger than that of PAN 109, process A is executed and topologies identical with those of FIG. 14 are formed.

If the number of active nodes does not agree with the number of nodes in each PAN in the above-described processes A to C, the master control station terminates the node allocation algorithm. However, the redundancy in the communication system can be optimized by lowering the redundancy R_th and repeating the execution of the node allocation algorithm.

The node allocation algorithm described above is such that in order to increase the number of active paths of a node for which the number of active paths is less than the redundancy in a PAN in which redundancy is not being maintained, a node is moved to this PAN from another PAN. Another method that may be used is to achieve the desired redundancy by moving the node for which the number of active paths is less than the redundancy to another PAN.

Figure 15:
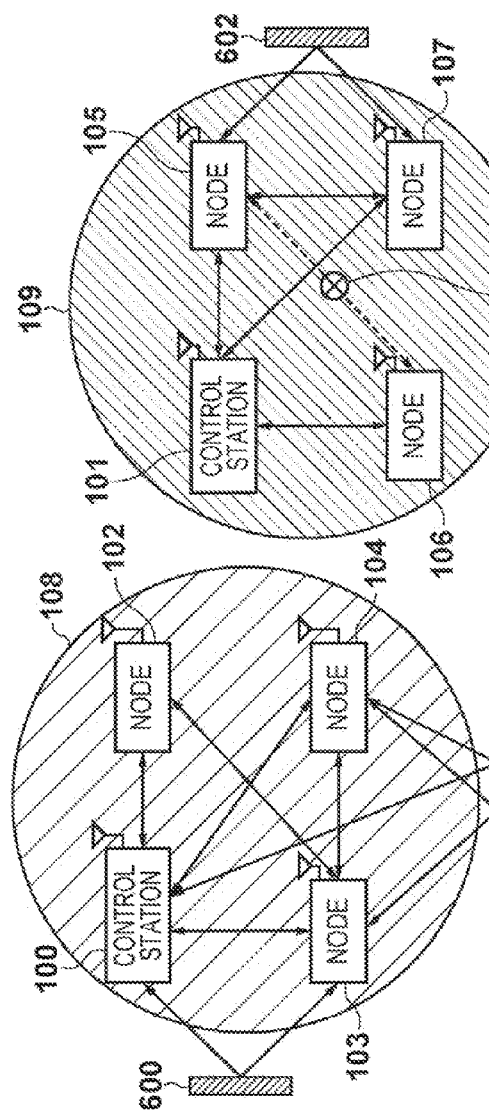
FIG. 15 is a diagram for describing processing in a case where an obstacle has appeared.

Further, the node allocation algorithm can be applied also to a case where redundancy of PAN 109 when an obstacle has appeared in the communication system is restored, as shown in FIG. 15. In FIG. 15, node 106 detects that received data from node 105 is interrupted in the event that an obstacle 1500 appears within PAN 109. Node 106 counts the number of consecutive errors regarding the received data and, if errors continue more than a predetermined number of times, notifies the slave control station of interruption of the communication path.

Furthermore, the slave control station notifies the master control station of interruption of the communication path and the master control station re-calculates the number of active nodes in PAN 109 and executes the node allocation algorithm. In order to restore the number of active communication paths of node 106 in FIG. 15, node 102 is moved to PAN 109 and topologies identical with those shown in FIG. 14 are formed.

[Modification]

In the embodiment set forth above, a case where the communication band used by a moved node is less than the inactive band in each PAN is described, as shown in FIG. 2. In a modification, a case where there is no inactive band in each PAN or a case where the communication band used by a moved node exceeds the inactive band of the PAN that is the destination of such movement will be described.

In a case where there is no inactive band in each PAN, nodes are interchanged between the PANs because a node cannot be moved from one PAN to the other. Described below is a node allocation algorithm for a case where nodes are interchanged between PANs.

In the algorithm of this modification, only the locations of processes A and B shown in FIGS. 10 and 11 differ. Accordingly, only the portions of this algorithm that are different will be described as processes A' and B'.

<Process A'>

Figure 16:
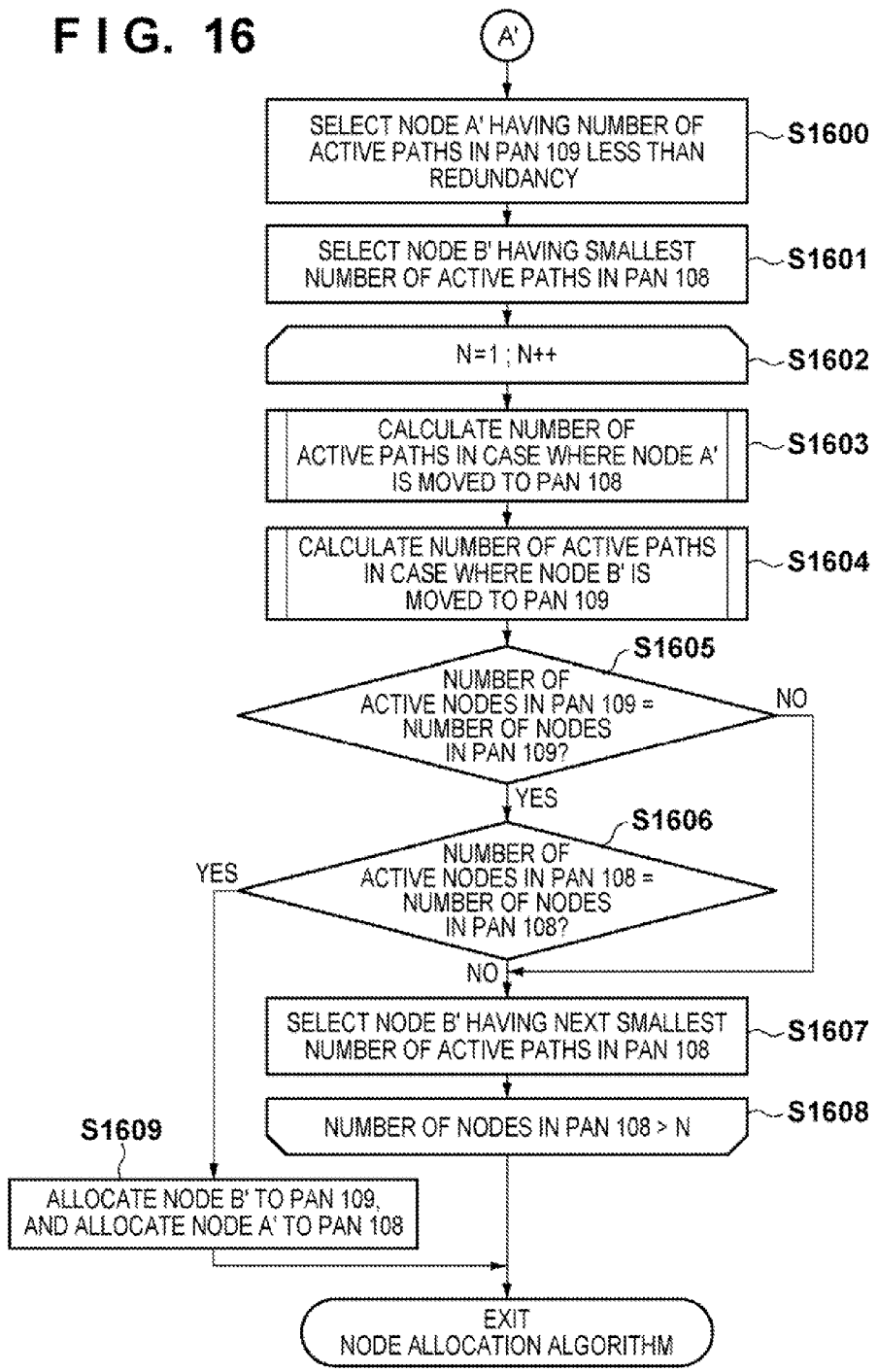
FIG. 16 is a flowchart illustrating a process A' in a modification.

FIG. 16 illustrates the flowchart of process A. As an example of operation, the initial topology and index tables will be described with reference to FIG. 8, and the topology and index tables after application of the algorithm will be described with reference to FIG. 17.

First, the master control station selects node A' for which the number of active paths in PAN 109 is less than the redundancy (step S1600). In FIG. 8, the number of active paths of node 106 under active path count 818 in PAN 109 is "1", and node 106 is selected as node A'. However, in a case where there are a plurality of nodes in the initial topology for which the number of active paths is less than the redundancy, the node having the smallest number of active paths is adopted as node A'.

Next, the master control station selects node B' for which the number of active paths in PAN 108 is smallest. In FIG. 8, node 102 is selected as node B' from active path count 816 in PAN 108. The master control station then calculates the numbers of active nodes in a case where node A' and node B' have been interchanged between the PANs (steps S1603, S1604).

FIG. 17 illustrates index tables calculated by process A'. Different communication paths 1700 to 1703 are formed by moving node 102 to PAN 109 and moving node display unit 106 to PAN 108.

Next, the master control station compares the calculated number of active nodes of each PAN with the total number of nodes of each PAN (steps S1605, S1606). Since the number of active nodes in PAN 109 is "3" and this agrees with the total number of nodes in PAN 109 inclusive of node 102, as illustrated in FIG. 17, the desired redundancy is achieved. Further, since the number of active nodes in PAN 108 is "3" and this agrees with the total number of nodes inclusive of node 106, as illustrated in FIG. 17, the desired redundancy is achieved. That is, the master control station reallocates node B' from PAN 108 to PAN 109, reallocates node A' from PAN 109 to PAN 108 (step S1609) and terminates this processing.

Further, in a case where the redundancy of each PAN is not achieved at steps S1605 and S1606, the node having the next smallest number of active paths in PAN 109 is adopted as node B' and processing similar to that of the above embodiment is repeatedly executed.

<Process B'>

Process B' is a process for a case where the relationship between PAN 108 and PAN 109 is reversed. Since the basic algorithm is the same as that of process A', it need not be described again here.

It should be noted that in the foregoing description, a moved node or an interchanged node is a single node in the node allocation algorithm. However, a plurality of nodes may be selected as long as the communication bands of these nodes will not exceed the disabled band of each PAN.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-244285, filed Oct. 29, 2010, which is hereby incorporated by reference herein in its entirety.

What is claimed is:

1. A communication system in which a plurality of control stations supervise respective ones of different networks and multiple nodes belonging to each network perform a data transmission, wherein each control station comprises:

an acquisition unit which acquires a number of active paths, of a node supervised by the control station, for which the qualities of communication links between the nodes belonging to the supervised network exceed a prescribed threshold value; and a moving unit which, in a case of existence of a node for which the number of active paths that exceeds the prescribed threshold value is less than a prescribed number N (N≥2), moves the node between the network in which the node exists and another network, wherein in a case where a node for which the number of active paths is less than the prescribed number N exists in each network, the moving unit moves the node in accordance with the overall number of the nodes and the number of nodes for which the number of active paths exceeds the prescribed number N in each network.

2. A control station of a communication system in which a plurality of control stations supervise respective ones of different networks and multiple nodes belonging to each network perform a data transmission, comprising:

an acquisition unit which acquires a number of active paths, of a node supervised by the control station, for which the qualities of communication links between the nodes belonging to the supervised network exceed a prescribed threshold value; and a moving unit which, in a case of existence of a node for which the number of active paths is less than a prescribed number N (N≥2), moves the node between the network in which the node exists and another network, wherein in a case where a node for which the number of active paths is less than the prescribed number N exists in each network, the moving unit moves the node in accordance with the overall number of the nodes and the number of nodes for which the number of active paths exceeds the prescribed number N in each network.

3. The control station according to claim 2, wherein the moving unit moves at least one node, from among the multiple nodes belonging to the another network, to the network supervised by the control station.

4. The control station according to claim 3, wherein a node for which the number of active paths in the another network is the smallest is selected as the node moved to the network.

5. The control station according to claim 2, wherein the moving unit moves a node from a network in which a ratio between the overall number of nodes and the number of nodes for which the number of active paths exceeds the prescribed number N is larger to a network in which the ratio is smaller.

6. The control station according to claim 2, wherein in a case where the ratios between the overall number of nodes and the number of nodes for which the number of active paths exceeds the prescribed number N are equal, the moving unit moves a node from the network in which the overall number of active nodes is more than the prescribed number N to the network in which the overall number of active paths is less than the prescribed number N.

7. The control station according to claim 2, wherein in a case where there is no communication band that can be used by the node in the network to which the node is moved, the moving unit interchanges nodes between the networks.

8. A communication method in a control station of a communication system in which a plurality of control stations supervise respective ones of different networks and multiple nodes belonging to each network perform a data transmission, comprising:
acquiring a number of active paths, of a node supervised by the control station, for which the qualities of communication links between the nodes belonging to the supervised network exceed a prescribed threshold value; and
in a case of existence of a node for which the number of active paths is less than a prescribed number N (N≥2), moving the node between the network in which this node exists and another network,
wherein in a case where a node for which the number of active paths is less than the prescribed number N exists in each network, the node is moved in the moving in accordance with the overall number of the nodes and the number of nodes for which the number of active paths exceeds the prescribed number N in each network.

9. A computer-readable recording medium storing a program for causing a computer to execute a communication method in a control station of a communication system in which a plurality of control stations supervise respective ones of different networks and multiple nodes belonging to each network perform a data transmission, comprising:
acquiring a number of active paths, of a node supervised by the control station, for which the qualities of communication links between the nodes belonging to the supervised network exceed a prescribed threshold value; and
in a case of existence of a node for which the number of active paths is less than a prescribed number N (N≥2), moving the node between the network in which this node exists and another network,
wherein in a case where a node for which the number of active paths is less than the prescribed number N exists in each network, the node is moved in the moving in accordance with the overall number of the nodes and the number of nodes for which the number of active paths exceeds the prescribed number N in each network.

10. A control station of a communication system in which a plurality of control stations supervise respective ones of different networks and multiple nodes belonging to each network perform a data transmission, comprising:
an acquisition unit which acquires a number of active paths, of a node supervised by the control station, for which qualities of communication links between the nodes belonging to the supervised network exceed a prescribed threshold value; and
a moving unit which, in a case of existence of a node for which the number of active paths is less than a prescribed number, moves the node between the network in which the node exists and another network,
wherein in a case where a node for which the number of active paths is less than a prescribed number exists in each network, the moving unit moves the node in accordance with an overall number of the nodes and the number of nodes for which the number of active paths exceeds the prescribed number in each network.

11. The control station according to claim 10, wherein the moving unit moves a node from a network in which a ratio between the overall number of nodes and the number of nodes for which the number of active paths exceeds the prescribed number is larger to a network in which the ratio is smaller.

12. The control station according to claim 10, wherein in a case where the ratios between the overall number of nodes and the number of nodes for which the number of active paths exceeds the prescribed number are equal, the moving unit moves a node from the network in which the overall number of active nodes is more than the prescribed number to the network in which the overall number of active paths is less than the prescribed number.

13. A communication method in a control station of a communication system in which a plurality of control stations supervise respective ones of different networks and multiple nodes belonging to each network perform a data transmission, comprising:
acquiring a number of active paths, of a node supervised by the control station, for which qualities of communication links between the nodes belonging to the supervised network exceed a prescribed threshold value; and
in a case of existence of a node for which the number of active paths is less than a prescribed number, moving the node between the network in which the node exists and another network,
wherein in a case where a node for which the number of active paths is less than a prescribed number exists in each network, the node is moved in the moving in accordance with an overall number of the nodes and the number of nodes for which the number of active paths exceeds the prescribed number in each network.

14. A computer-readable recording medium storing a program for causing a computer to execute a communication method in a control station of a communication system in which a plurality of control stations supervise respective ones of different networks and multiple nodes belonging to each network perform a data transmission, comprising:
acquiring a number of active paths, of a node supervised by the control station, for which qualities of communication links between the nodes belonging to the supervised network exceed a prescribed threshold value; and in a case of existence of a node for which the number of active paths is less than a prescribed number, moving the node between the network in which the node exists and another network, wherein in a case where a node for which the number of active paths is less than a prescribed number exists in each network, the node is moved in the moving in accordance with an overall number of the nodes and the number of nodes for which the number of active paths exceeds the prescribed number in each network.

* * * * *